(12) United States Patent
Nakamura

(10) Patent No.: US 10,864,900 B2
(45) Date of Patent: Dec. 15, 2020

(54) CONTROL DEVICE OF VEHICLE DRIVE DEVICE, VEHICLE-MOUNTED ELECTRONIC CONTROL UNIT, TRAINED MODEL, MACHINE LEARNING SYSTEM, METHOD OF CONTROLLING VEHICLE DRIVE DEVICE, METHOD OF PRODUCING ELECTRONIC CONTROL UNIT, AND OUTPUT PARAMETER CALCULATION DEVICE

(71) Applicant: TOYOTA JIDOSHA KABUSHIKI KAISHA, Toyota (JP)

(72) Inventor: Toshihiro Nakamura, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/569,088

(22) Filed: Sep. 12, 2019

(65) Prior Publication Data

US 2020/0108815 A1 Apr. 9, 2020

(30) Foreign Application Priority Data

Oct. 9, 2018 (JP) .................................. 2018-191214

(51) Int. Cl.
| | |
|---|---|
| *F02D 41/26* | (2006.01) |
| *B60W 10/06* | (2006.01) |
| *G05B 13/02* | (2006.01) |
| *G06N 3/04* | (2006.01) |

(52) U.S. Cl.
CPC ........... *B60W 10/06* (2013.01); *G05B 13/027* (2013.01); *G06N 3/04* (2013.01);
(Continued)

(58) Field of Classification Search
CPC ......... B60W 10/06; B60W 2510/0638; B60W 2510/0676; B60W 2710/0688;
(Continued)

(56) References Cited

U.S. PATENT DOCUMENTS 5,130,936 A * 7/1992 Sheppard ............ G06F 11/2257
128/925
5,625,750 A * 4/1997 Puskorius ............... F01N 11/00
123/672
(Continued)

FOREIGN PATENT DOCUMENTS

| EP | 2 397 676 A1 | 12/2011 |
|---|---|---|
| JP | 2011-054200 A | 3/2011 |

*Primary Examiner* — Hai H Huynh
(74) *Attorney, Agent, or Firm* — Oliff PLC

(57) ABSTRACT

A control device 60 of a vehicle drive device comprises a processing part 81 configured to use a trained model using a neural network to calculate at least one output parameter of a vehicle, and a control part 82 configured to control the vehicle drive device. The neural network includes a first input layer to which at least one first input parameter of the vehicle at a first point of time is input, a second input layer to which at least one second input parameter of the vehicle at a second point of time is input, a first hidden layer to which outputs of the first input layer are input, a second hidden layer to which at least one value correlated with the outputs of the first hidden layer, and outputs of the second input layer are input, and an output layer outputting at least one output parameter.

16 Claims, 11 Drawing Sheets

(52) U.S. Cl.
CPC ........... *B60W 2510/0638* (2013.01); *B60W 2510/0676* (2013.01); *B60W 2710/0688* (2013.01)

(58) Field of Classification Search
CPC ...... G05B 13/027; G06N 3/04; G06N 3/0481; G06N 3/084; F02D 41/1405; F02D 41/1461; F02D 41/1467; F02D 41/402; F02D 41/403; F02D 35/024; F02D 35/023; F02D 2200/025
USPC .............. 123/480, 490, 472, 90.11, 399; 701/102–107, 114–115
See application file for complete search history.

(56) References Cited

U.S. PATENT DOCUMENTS

| | | | | |
|---|---|---|---|---|
| 5,719,480 A * | 2/1998 | Bock | ........................ | B25J 9/163 318/561 |
| 5,904,227 A * | 5/1999 | Whitehall | ............ | B66B 1/2408 187/380 |
| 6,236,908 B1 * | 5/2001 | Cheng | ................ | F02D 41/0062 701/1 |
| 6,466,924 B1 * | 10/2002 | Tateishi | .................. | G06N 3/02 706/15 |
| 6,493,689 B2 * | 12/2002 | Kotoulas | ................ | F16F 15/02 706/23 |
| 6,601,051 B1 * | 7/2003 | Lo | ...................... | H03H 21/0012 706/23 |
| 6,882,929 B2 * | 4/2005 | Liang | ...................... | F01N 3/208 123/295 |
| 7,142,975 B2 * | 11/2006 | Wang | .................... | F02D 35/024 701/114 |
| 7,181,334 B2 * | 2/2007 | Kropinski | ............ | F02D 41/222 701/106 |
| 7,917,333 B2 * | 3/2011 | Grichnik | ................ | G05B 17/02 123/486 |
| 8,453,431 B2 * | 6/2013 | Wang | ...................... | F02D 41/00 60/285 |
| 8,965,664 B2 * | 2/2015 | Yasui | .................. | F02D 41/0062 701/106 |
| 9,328,644 B2 * | 5/2016 | Cui | ........................ | F01N 11/00 |
| 10,634,081 B2 * | 4/2020 | Kitagawa | ............... | G06N 20/00 |
| 2015/0088398 A1 | 3/2015 | Cui et al. | | |
| 2018/0086222 A1 | 3/2018 | Juang et al. | | |
| 2019/0145859 A1 * | 5/2019 | Chen | ..................... | G06N 5/046 701/102 |
| 2019/0244106 A1 * | 8/2019 | Franca-Neto | ........ | G06N 3/0454 |

* cited by examiner

CONTROL DEVICE OF VEHICLE DRIVE DEVICE, VEHICLE-MOUNTED ELECTRONIC CONTROL UNIT, TRAINED MODEL, MACHINE LEARNING SYSTEM, METHOD OF CONTROLLING VEHICLE DRIVE DEVICE, METHOD OF PRODUCING ELECTRONIC CONTROL UNIT, AND OUTPUT PARAMETER CALCULATION DEVICE

FIELD

The present invention relates to a control device of a vehicle drive device, a vehicle-mounted electronic control unit, a trained model, a machine learning system, a method of controlling a vehicle drive device, a method of producing an electronic control unit, and an output parameter calculation device.

BACKGROUND

In the past, it has been known to use a neural network including an input layer, intermediate layers (hidden layers), and an output layer to derive a predetermined output parameter from predetermined input parameters (for example, PTL 1).

CITATIONS LIST

Patent Literature

[PTL 11] Japanese Unexamined Patent Publication No. 2011-54200

SUMMARY

Technical Problem

In the neural network described in PTL 1, each of the nodes of the input layer are connected in parallel to each of the nodes of one intermediate layer. In such a neural network, the changes in input parameters along with time are not represented in the model of the neural network, so the precision of prediction with respect to events occurring in a sequence of time falls.

Therefore, an object of the present invention is to use a neural network to predict events occurring in a sequence of time with a good precision.

Solution to Problem

The summary of the present disclosure is as follows.

(1) A control device of a vehicle drive device comprising a processing part configured to use a trained model using a neural network to calculate at least one output parameter of a vehicle, and a control part configured to control the vehicle drive device mounted in the vehicle based on the at least one output parameter calculated by the processing part, wherein the neural network includes a first input layer to which at least one first input parameter of the vehicle at a first point of time is input, a second input layer to which at least one second input parameter of the vehicle at a second point of time after the first point of time is input, a first hidden layer to which outputs of the first input layer are input, a second hidden layer to Which at least one value correlated with the outputs of the first hidden layer, and outputs of the second input layer are input, and an output layer outputting at least one output parameter.

(2) The control device of a vehicle drive device described in above (1), wherein the number of the second input parameters is smaller than the number of the first input parameters.

(3) The control device of a vehicle drive device described in above (2), wherein the second input parameters are a part of the first input parameters.

(4) The control device of a vehicle drive device described in any one of above (1) to (3), wherein the neural network is configured so that outputs of the first hidden layer are input to the second hidden layer.

(5) The control device of a vehicle drive device described in any one of above (1) to (3), wherein the neural network includes at least one hidden layer between the first hidden layer and the second hidden layer.

(6) The control device of a vehicle drive device described in any one of above (1) to (5), wherein the neural network is configured so that outputs of the second hidden layer are input to the output layer.

(7) The control device of a vehicle drive device described in any one of above (1) to (5), wherein the neural network includes at least one hidden layer between the second hidden layer and the output layer.

(8) The control device of a vehicle drive device-described in any one of above (1) to (7), wherein the control part is configured to control an internal combustion engine mounted in the vehicle, and the first input parameters include at least one of engine speed, engine water temperature, concentration of oxygen in intake inside an intake manifold, cylinder intake amount, cylinder volume, cylinder pressure, cylinder temperature, fuel injection amount, fuel injection timing, and fuel injection pressure, the second input parameters include at least one of a fuel injection amount, fuel injection timing, and fuel injection pressure, and the output parameters include at least one of a sound pressure of combustion noise, a concentration of harmful substances discharged from an engine body, and a heat efficiency of the internal combustion engine.

(9) The control device of a vehicle drive device described in above (8), wherein the first input parameters include the cylinder pressure and cylinder temperature, and the second input parameters do not include the cylinder pressure and cylinder temperature.

(10) A vehicle-mounted electronic control unit comprising a processing part configured to receive a trained model using a neural network through a communication device provided at a vehicle from a server at an outside of the vehicle and using the trained model to calculate at least one output parameter of the vehicle, wherein the neural network includes a first input layer to which at least one first input parameter of the vehicle at a first point of time is input, a second input layer to which at least one second input parameter of the vehicle at a second point of time after the first point of time is input, a first hidden layer to which outputs of the first input layer are input, a second hidden layer to which at least one value correlated with the outputs of the first hidden layers, and outputs of the second input layer are input, and an output layer outputting at least one output parameter, and the server comprises a storage device storing sets of training data including the first input parameters, the second input parameters, and the output parameters and is configured to use the sets of training data to generate the trained model.

(11) A vehicle-mounted electronic control unit comprising a parameter acquiring part configured to acquire at least one first input parameter of a vehicle at a first point of time, at least one second input parameter of the vehicle at a second point of time after the first point of time, and at least one output parameter of the vehicle at a point of time after the second point of time, and send the at least one first input parameter, the at least one second input parameter, and at least one output parameter through a communication device provided at the vehicle to a server at an outside of the vehicle, and a processing part configured to receive a trained model using a neural network from the server through the communication device and using the trained model to calculate the at least one output parameter, wherein the neural network includes a first input layer to which the at least one first input parameter is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting the at least one output parameter, and the server uses the at least one first input parameter, the at least second input parameter, and the at least output parameters acquired by the parameter acquiring part as sets of training data to generate the trained model.

(12) A trained model using a neural network including a first input layer to which at least one first input parameter of a vehicle at a first point of time is input, a second input layer to which at least one second input parameter of the vehicle at a second point of time after the first point of time is input, a first hidden layer to which outputs of the first input layer are input, a second hidden layer to which at least one value correlated with the outputs of the first hidden layer, and outputs of the second input layer are input, and an output layer outputting at least one output parameter of the vehicle, wherein weights of the neural network have been trained using the at least one first input parameter, the at least one second input parameter, and the at least one output parameter as sets of training data.

(13) A machine learning system comprising an electronic control unit provided at a vehicle, a communication device provided at the vehicle, and a server at an outside of the vehicle, wherein, the electronic control unit comprises a parameter acquiring part configured to acquire at least one first input parameter of the vehicle at a first point of time, at least one second input parameter of the vehicle at a second point of time after the first point of time, and at least one output parameter of the vehicle at a point of time after the second point of time, and send the at least one first input parameter, the at least one second input parameter, and the at least one output parameter through the communication device to the server, and a processing part configured to receive a trained model using a neural network from the server through the communication device and use the trained model to calculate the at least one output parameter, wherein the neural network includes a first input layer to which the at least one first input parameters is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting at least one output parameter, and the server is configured to use the at least one first input parameter, the at least one second input parameter, and the at least one output parameter acquired by the parameter acquiring part as sets of training data to generate the trained model.

(14) A method of controlling a vehicle drive device comprising acquiring at least one first input parameter of a vehicle at a first point of time and at least-one second input parameter of the vehicle at a second point of time after the first point of time, using a trained model using a neural network to calculate at least one output parameter of the vehicle based the at least one first input parameter and the at least one the second input parameter, and controlling a vehicle drive device mounted in the vehicle based on the at least one output parameter, wherein the neural network include a first input layer to which the at least one first input parameter is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting the at least one output parameter.

(15) A method of producing an electronic control unit comprising: using at least one first input parameter of a vehicle at a first point of time, at least one second input parameter of the vehicle at a second point of time after the first point of time, and at least one output parameter of the vehicle at a point of time after the second point of time as sets of training data to generate a trained model using a neural network, and implementing the trained model into the electronic control unit, wherein the neural network includes a first input layer to which the at least one first input parameter is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting the at least one output parameter.

(16) An output parameter calculation device configured to use a trained model using a neural network including a first input layer to which at least one first input parameter at a first point of time is input, a second input layer to which at least one second input parameter at a second point of time after the first point of time is input, a first hidden layer to Which outputs of the first input layer are input, a second hidden layer to which at least one value correlated with the outputs of the first hidden layer, and outputs of the second input layer are input, and an output layer outputting at least one output parameter so as to calculate the at least one output parameter based on the at least one first input parameter and the at least one second input parameter.

Advantageous Effects of Invention

According to the present invention, it is possible to use a neural network to predict events occurring in a sequence of time with a good precision.

DESCRIPTION OF EMBODIMENTS

Figure 1:
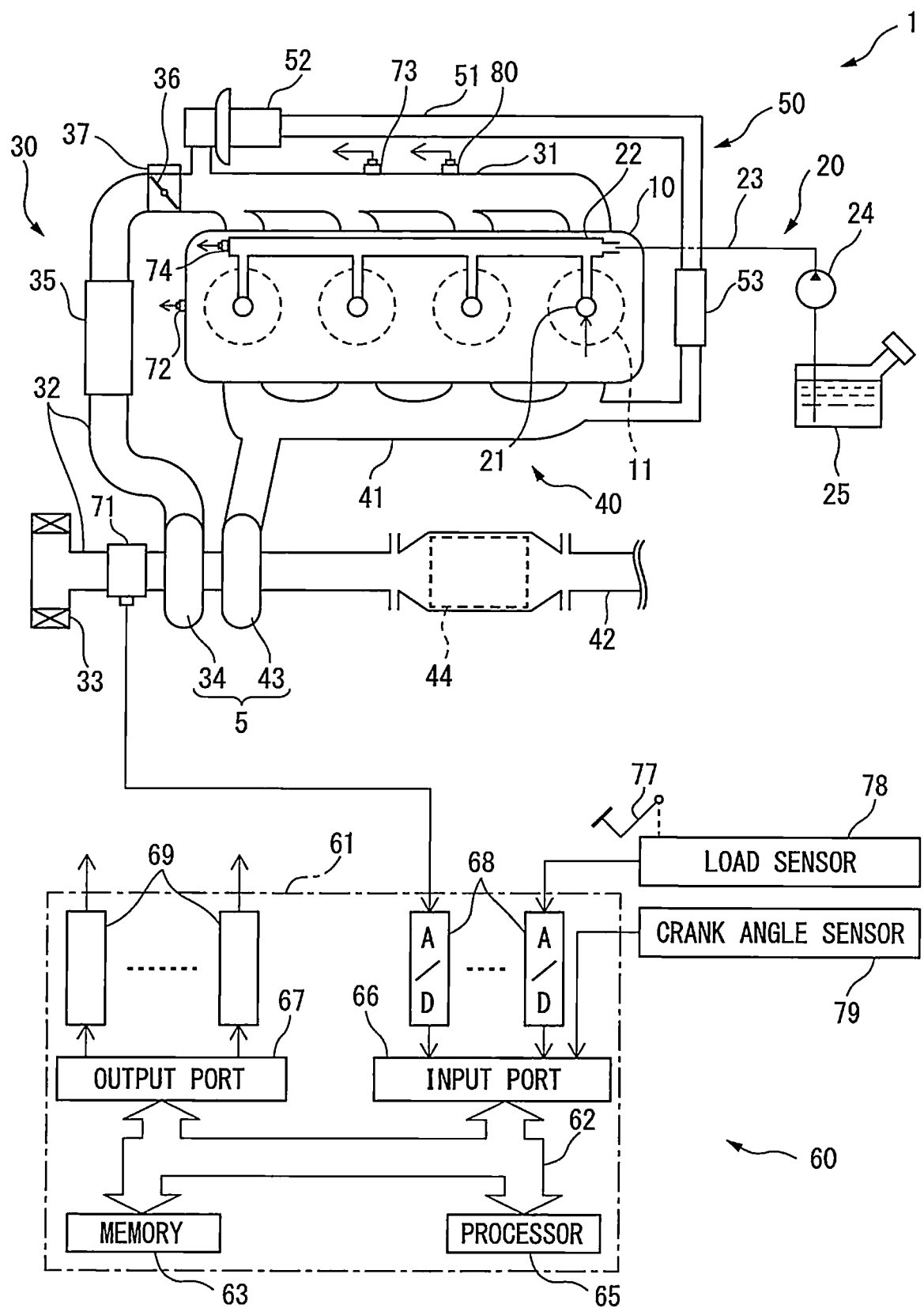
FIG. 1 is a view schematically showing an internal combustion engine in which a control device of a vehicle drive device according to a first embodiment is used.

Below, referring to the drawings, embodiments of the present invention will be explained in detail. Note that, in the following explanation, similar component elements are assigned the same reference notations.

First Embodiment

First, referring to FIG. 1 to FIG. 9, a first embodiment of the present invention will be explained.

<Explanation of Internal Combustion Engine as a Whole>

FIG. 1 is a view schematically showing an internal combustion engine in which a control device of a vehicle drive device according to a first embodiment is used. The internal combustion engine 1 shown in FIG. 1 is a compression ignition type internal combustion engine (diesel engine) and is mounted in a vehicle. The internal combustion engine 1 is one example of a vehicle drive device.

The internal combustion engine 1 is provided with an engine body 10, a fuel feed system 20, an intake system 30, an exhaust system 40, and an exhaust gas recirculation (EGR) system 50. The engine body 10 is provided with a cylinder block in which a plurality of cylinders 11 are formed, a cylinder head in which intake ports and exhaust ports are formed, and a crankcase. In the present embodiment, there are four cylinders 11. Inside of each cylinder 11, a piston is arranged. Each cylinder 11 is communicated with an intake port and exhaust port. Further, at the cylinder head, intake valves configured to open and close the intake ports and exhaust valves configured to open and close the exhaust ports are provided.

The fuel feed system 20 is provided with fuel injectors 21, a common rail 22, a fuel feed pipe 23, a fuel pump 24 and a fuel tank 25. The fuel injectors 21 are connected through the common rail 22 and fuel feed pipe 23 to the fuel tank 25. The fuel injectors 21 are arranged in the cylinder head so as to directly inject fuel into combustion chambers of the cylinders 11. The fuel injectors 21 are so-called "cylinder injectors". At the fuel feed pipe 23, a fuel pump 24 for pumping fuel inside the fuel tank 25 is arranged. The fuel pumped by the fuel pump 24 is fed through the fuel feed pipe 23 to the common rail 22 and is directly injected from the fuel injectors 21 to the insides of the combustion chambers of the cylinders 11. The pressure of the fuel in the common rail 22 is adjusted by changing the output of the fuel pump 24.

The intake system 30 is provided with intake ports, an intake manifold 31, intake pipe 32, air cleaner 33, compressor 34 of the turbocharger 5, intercooler 35, and throttle valve 36. The intake ports, intake manifold 31, and intake pipe 32 form an intake passage guiding air to the insides of the cylinders 11.

The intake ports of the cylinders 11 are communicated through the intake manifold 31 and intake pipe 32 to the air cleaner 33. Inside of the intake pipe 32, a compressor 34 for compressing and discharging intake air flowing through the intake pipe 32, and an intercooler 35 cooling the air compressed by the compressor 34 are provided. The throttle valve 36 can be made to turn by a throttle valve drive actuator 37 so as to change the opening area of the intake passage.

The exhaust system 40 is provided with exhaust ports, an exhaust manifold 41, exhaust pipe 42, turbine 43 of the turbocharger 5, and diesel particulate filter (DPF) 44. The exhaust ports, exhaust manifold 41, and exhaust pipe 42 form an exhaust passage discharging exhaust gas produced due to combustion of the air-fuel mixture inside the combustion chambers.

The exhaust ports of the cylinders 11 communicate through the exhaust manifold 41 and the exhaust pipe 42 with the DPF 44, The exhaust pipe 42 is provided with a turbine 43 driven to turn by the energy of the exhaust gas. If the turbine 43 is driven to turn, along with this, the compressor 34 is turned and accordingly the intake air is compressed. In the present embodiment, the turbine 43 is provided with a variable nozzle. If the opening degree of the variable nozzle is changed, the flow rate of the exhaust gas supplied to the turbine blades of the turbine 43 changes. As a result, the rotational speed of the turbine 43 changes.

The DPF 44 traps the particulate matter (PM) in the exhaust gas. Note that, the exhaust system 40 may be provided with another exhaust purification device instead of the DPF 44 or in addition to the DPF 44. The other exhaust purification device, for example, may be a selective reduction type $NO_X$ reduction catalyst (SCR catalyst), $NO_X$ storage reduction catalyst, oxidation catalyst, etc.

The EGR system 50 feeds a part of the exhaust gas discharged from the engine body 10 to the exhaust passage to the intake passage. The EGR system 50 is provided with an EGR pipe 51, EGR control valve 52, and EGR cooler 53. The EGR pipe 51 is connected with the exhaust manifold 41 and the intake manifold 31 and connects these with each other. At the EGR pipe 51, an EGR cooler 53 is provided for cooling the EGR gas flowing through the inside of the EGR pipe 51. Further, the EGR pipe 51 is provided with an EGR control valve 52 able to change the opening area of the EGR passage formed by the ERG pipe 51. By controlling the opening degree of the EGR control valve 52, the amount of flow of the EGR gas recirculated from the exhaust manifold 41 to the intake manifold 31 is adjusted and, as a result, the EGR rate is changed. Note that, the EGR rate is the ratio of the amount of EGR gas to the total amount of gas fed to the insides of the cylinders 11 (total of amount of fresh air and amount of EGR gas).

Note that, the configuration of the internal combustion engine 1 is not limited to the above one. Therefore, the cylinder array, the fuel injection mode, the configuration of the intake/exhaust systems, the configuration of the valve operation mechanism, the configuration of the supercharger, and presence of a supercharger or other such specific constitutions of the internal combustion engine may differ from the configurations illustrated in FIG. 1.

<Control Device of Vehicle Drive Device>

The control device 60 of the vehicle drive device (in the present embodiment, the internal combustion engine 1) is provided with an electronic control unit (ECU) 61 and the various sensors. The various controls of the internal combustion engine 1 are performed by the ECU 61 based on the outputs of the various sensors, etc.

The ECU 61 is comprised of a digital computer and is provided with components connected with each other through a bidirectional bus 62 such as a memory 63, processor 65, input port 66, and output port 67. The memory 63 is provided with a volatile memory (for example, RAM) and nonvolatile memory (for example, ROM) and stores programs to be run at the processor 65, various data used when various processing is performed by the processor 65, etc.

The outputs of the various sensors are input to the input port 66. In the present embodiment, the outputs of an air flow meter 71, water temperature sensor 72, oxygen concentration sensor 73, intake temperature sensor 80, fuel pressure sensor 74, and load sensor 78 are input through corresponding AD converters 68 to the input port 66.

The air flow meter 71 is arranged in the intake pipe 32 between the air cleaner 33 and the compressor 34 and detects the flow rate of air inside the intake pipe 32. The water temperature sensor 72 is arranged in the cooling water path of the internal combustion engine 1 and detects the water temperature of the cooling water of the internal combustion engine 1 (engine water temperature). The oxygen concentration sensor 73 is arranged in the intake manifold 31 and detects the concentration of oxygen in the intake in the intake manifold. 31 (in the present embodiment, fresh air and EGR gas). The intake temperature sensor 80 is arranged in the intake manifold 31 and detects the temperature of the intake inside the intake manifold 31.

The fuel pressure sensor 74 is arranged in the common rail 22 and detects the pressure of the fuel inside the common rail 22, that is, the pressure of the fuel fed to the fuel injectors 21. The load sensor 78 is connected to an accelerator pedal 77 provided in the vehicle and generates an output voltage proportional to the amount of depression of the accelerator pedal 77. The load sensor 78 detects the engine load. Further, the input port 66 is connected to a crank angle sensor 79 generating an output pulse each time the crankshaft for example rotates by 10°. The output pulse is input to the input port 66. The crank angle sensor 79 detects the engine speed.

On the other hand, the output port 67 is connected through the corresponding drive circuits 69 to various actuators of the internal combustion engine 1. In the present embodiment, the output port 67 is connected to a variable nozzle of the turbine 43, the fuel injectors 21, fuel pump 24, throttle valve drive actuator 37, and EGR control valve 52. The ECU 61 outputs control signals for controlling these actuators from the output port 67 to thereby control the internal combustion engine 1.

Figure 2:
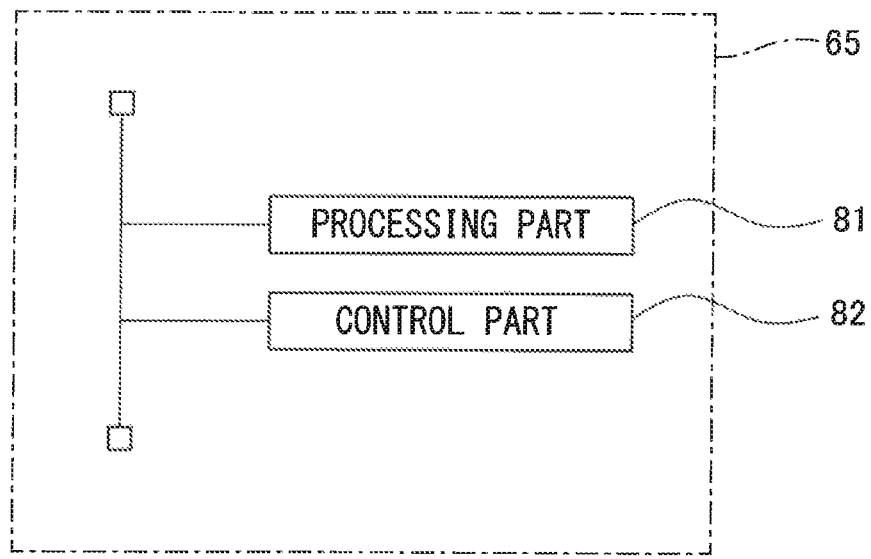
FIG. 2 is a functional block diagram of a processor of an ECU in the first embodiment.

FIG. 2 is a functional block diagram of a processor 65 of the ECU 61 in the first embodiment. In the present embodiment, the processor 65 has a processing part 81 and control part 82. The processing part 81 uses a trained model using the neural network to calculate the output parameters of the vehicle. The control part 82 controls the vehicle drive device based on the output parameters of the vehicle calculated by the processing part 81.

<Summary of Neural Network>

Figure 3:
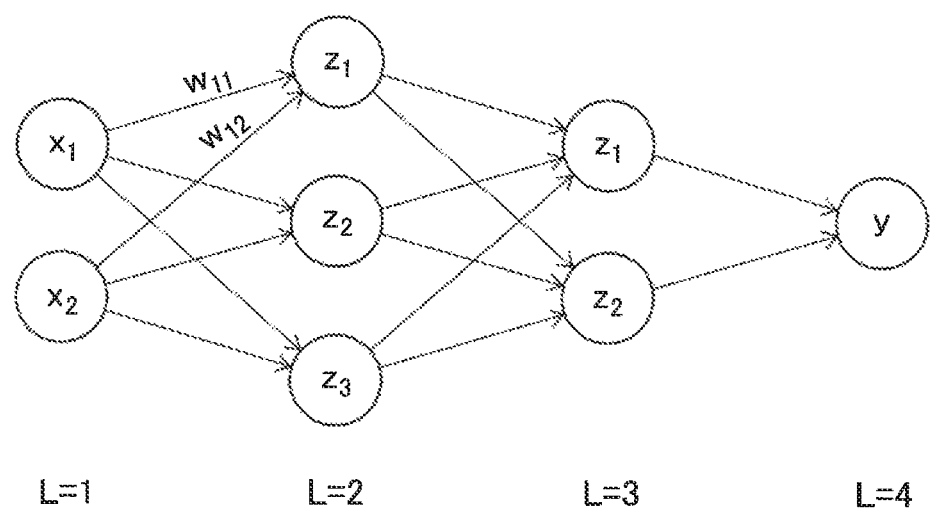
FIG. 3 shows one example of a neural network having a simple configuration.

First, referring to FIG. 3, a summary of the neural network will be explained. FIG. 3 shows one example of a neural network having a simple configuration.

The circle marks in FIG. 3 show artificial neurons. An artificial neuron is usually called a "node" or "unit" (in this Description, called a "node"). In FIG. 3, L=1 indicates an input layer, L=2 and L=3 indicates hidden layers, and L=4 indicates an output layer. Note that, the hidden layers are also called "intermediate layers".

In FIG. 3, $x_1$ and $x_2$ indicate nodes of the input layer (L=1) and output values from the nodes, while "y" indicates a node of the output layer (L=4) and its output values. Similarly, the $z_1^{(L=2)}$, $z_2^{(L=2)}$, and $z_3^{(L=2)}$ indicates nodes of the hidden layers (L=2) and the output values from the nodes, while $z_1^{(L=3)}$ and $z_2^{(L=3)}$ indicate nodes of the hidden layers (L=3) and the output values from the nodes.

At the nodes of the input layer, inputs are output as they are. On the other hand, at the nodes of the hidden layer (L=2), the output values $x_1$ and $x_2$ of the nodes of the input layer are input. At the nodes of the hidden layers (L=2), corresponding weights "w" and biases "b" are used to calculate total input values "u". For example, in FIG. 3, total input values $u_k^{(L=2)}$ calculated at the nodes shown by $z_k^{(L=2)}$ (k=1, 2, 3) of the hidden layer (L=2) become as in the following equation (M is the number of nodes of the input layer).

$$u_k^{(L=2)} = \sum_{m=1}^{M} (x_m \cdot W_{km}^{(L=2)}) + b_k \quad \text{[Equation 1]}$$

Next, this total input values $u_k^{(L=2)}$ are converted by the activation function "f" and are output as the output values $z_k^{(L=2)}$ (=f($u_k^{(L=2)}$)) from the nodes shown by $z_k^{(L=2)}$ of the hidden layers (L=2). On the other hand, the nodes of the hidden layer (L=3) receive as input the output values $z_1^{(L=2)}$, $z_2^{(L=2)}$, and $z_3^{(L=2)}$ of the nodes of the hidden layer (L=2). At the nodes of the hidden layer (L=3), the corresponding weights "w" and biases "h" are used to calculate the total input values "u" (=Σz·w+b). The total input values "u" are similarly converted by an activation function and are output from the nodes of the hidden layers (L=3) as the output values $z_1^{(L=3)}$ and $z_2^{(L=3)}$. The activation function is for example a Sigmoid function σ.

Further, the node of the output layer (L=4) receives as input the output values $z_1^{(L=3)}$ and $z_2^{(L=3)}$ of the nodes of the hidden layer (L=3). At the node of the output layer, the corresponding weights "w" and biases "b" are used to calculate the total input value "u" (Σz·w+b) or only the corresponding weights "w" are used to calculate the total input value "u" (Σz·w). For example, at the node of the output layer, an identity function is used as the activation function. In this case, the total input value "u" calculated at the node of the output layer is output as it is as the output value "y" from the node of the output layer.

<Learning at Neural Network>

In the present embodiment, the error backpropagation algorithm is used to learn the values of the weights "w" and the values of the biases "b" inside the neural network. The error backpropagation algorithm is known, so the error backpropagation algorithm will be explained only in brief below. Note that, a bias "b" is a type of weight "w", so in the following explanation, a bias "b" is considered one weight "w".

In the neural network such as shown in FIG. 3, if expressing the weights at the total input values $u^{(L)}$ to the nodes of the layers of L=2, L=3 or L=4 as $w^{(L)}$, the differential according to the weights $w^{(L)}$ of the error function E, that is, gradients $\partial E/\partial w^{(L)}$, are rewritten as the following equation:

[Equation 2]

$$\partial E/\partial w^{(L)}=(\partial E/\partial u^{(L)})(\partial u^{(L)}/\partial w^{(L)}) \quad (1)$$

Here, $z^{(L-1)} \cdot \partial w^{(L)} = \partial u^{(L)}$, and therefore if $(\partial E/\partial u^{(L)})=\delta^{(L)}$, the above-mentioned equation (1) is converted to the following equation:

[Equation 3]

$$\partial E/\partial w^{(L)}=\delta^{(L)} \cdot z^{(L-1)} \quad (2)$$

Here, if $u^{(L)}$ change, a change in the error function E is caused through changes in the total input values $u^{(L+1)}$ of the next layer, so $\delta^{(L)}$ can be expressed by the following equation (K is the number of nodes at the L+1 layer).

[Equation 4]

$$\delta^{(L)} = (\partial E/\partial u^{(L)}) = \sum_{k=1}^{K}(\partial E/\partial u_k^{(L+1)})(\partial u_k^{(L+1)}/\partial u^{(L)}) \quad (3)$$

$$(k=1, 2, \ldots, K)$$

Here, if $z^{(L)}=f(u^{(L)})$, the total input values $u_k^{(L+1)}$ at the right side of the above equation (3) are expressed by the following equation:

[Equation 5]

$$u_k^{(L+1)} = \sum_{k=1}^{K} w_k^{(L+1)} \cdot z^{(L)} = \sum_{k=1}^{K} w_k^{(L+1)} \cdot f(u^{(L)}) \quad (4)$$

Here, the first term $(\partial E/\partial u^{(L+1)})$ at the right side of the above equation (3) is $\delta^{(L+1)}$. Further, the second term $(\partial u_k^{(L+1)}/\partial u^{(L)})$ at the right side of the above equation (3) is expressed by the following equation:

[Equation 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is expressed by the following equation:

[Equation 7]

$$\delta^{(L)} = \sum_{k=1}^{K} w_k^{(L+1)} \cdot \delta^{(L+1)} \cdot f'(u^{(L)}) \quad (6)$$

That is, $$\delta^{(L-1)} = \sum_{k=1}^{K} w_k^{(L)} \cdot \delta^{(L)} \cdot f'(u^{(L-1)})$$

That is, if $\delta^{(L+1)}$ is found, $\delta^{(L)}$ can be found.

If the neural network is trained, a set of training data including a certain input value "x" and true data $y_t$ of the output for that input value "x" is used. If the output value from the output layer for a certain input value "x" is "y", and the squared error is used as the error function, the error function E becomes $E=\frac{1}{2}(y-y_t)^2$. Further, at the node of the output layer (L=4) of FIG. 3, the output value "y" becomes $f(u^{(L)})$. For this reason, the value of $\delta^{(L)}$ at the node of the output layer (L=4) becomes as shown in the following equation:

[Equation 8]

$$\delta^{(L)}=\partial E/\partial u^{(L)}=(\partial E/\partial y)(\partial y/\partial u^{(L)})=(y-y_t) \cdot f'(u^{(L)}) \quad (7)$$

Here, if the activation function $f(u^{(L)})$ of the output layer is an identity function, $f'(u^{(L)})=1$ Therefore, $\delta^{(L)}=y-y_t$ and $\delta^{(L)}$ is found.

If $\delta^{(L)}$ is found, the above equation (6) is used to find the $\delta^{(L-1)}$ of the previous layer. In this way, the δ's of the previous layers are successively found. The values of these δ's are used to find the differential according to the weights "w" of the error function E, that is, the gradient $\partial E/\partial w^{(L)}$ from the above equation (2). If the gradient $\partial E/\partial w^{(L)}$ is found, this gradient $\partial E/\partial w^{(L)}$ is used to update the values of the weights "w" so that the value of the error function E is decreased. That is, learning of the weights "w" are performed.

<Neural Network at Present Embodiment>

Below, the neural network used in the processing part 81 of the present embodiment will be explained. In the present embodiment, the neural network used in the processing part 81 creates a model of events occurring in a sequence of time.

Figure 4:
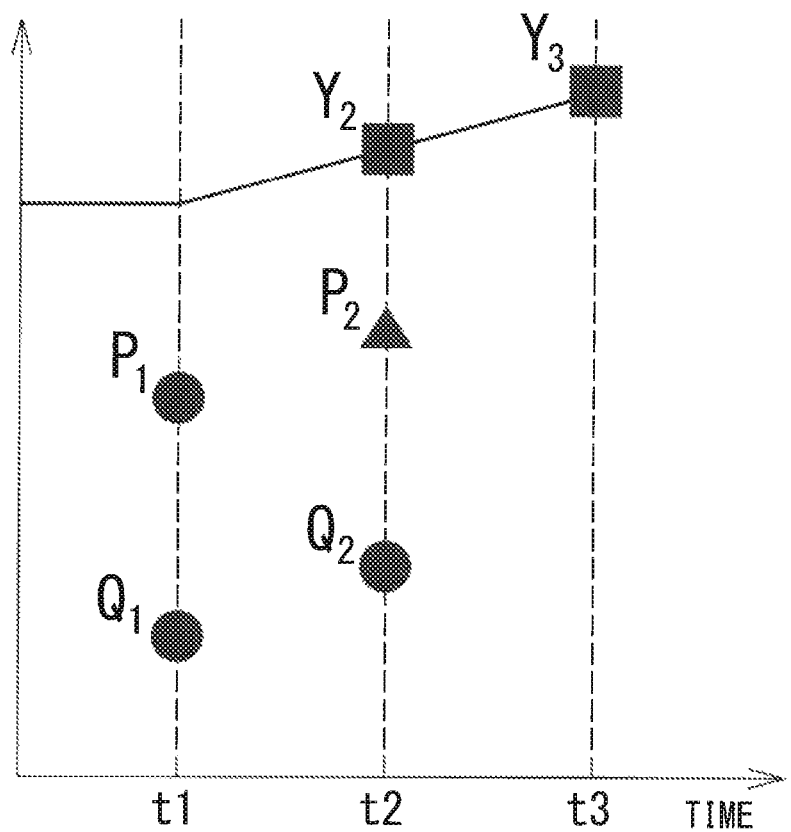
FIG. 4 is a view showing one example of events occurring in a sequence of time.

FIG. 4 is a view showing one example of events occurring in a sequence of time. In FIG. 4, P, Q, and Y respectively indicate predetermined parameters of the vehicle change in a time sequence. The parameters Y are affected by the parameters P and Q. Specifically, the parameter $Y_2$ at the time t2 is affected by the parameters $P_1$ and $Q_1$ at the time t1 before the time t2. Therefore, the parameter $Y_2$ at the time t2 is expressed as a function of the parameters $P_1$ and $Q_1$ ($f(P_1, Q_1)$) at the time t1. Further, the parameter $Y_3$ at the time t3 is affected by the parameters $P_2$ and $Q_2$ at the time t2 before the time t3. Therefore, the parameter $Y_3$ at the time t3 is expressed as a function of the parameters $P_2$ and $Q_2$ ($g(P_2, Q_2)$) at the time t2.

For this reason, if using the neural network to predict the parameter $Y_3$, it may be considered to use the parameters $P_2$ and $Q_2$ as input parameters and use the parameter $Y_3$ as the output parameter. However, in the example of FIG. 4, the parameter $P_2$ cannot be monitored, so the parameter $P_2$ cannot be used as an input parameter.

In this case, it may be considered to use the monitorable parameters $P_1$, $Q_1$, and $Q_2$ as input parameters and input the input parameters to the input layer. For example, the input parameters $P_1$, $Q_1$, and $Q_2$ are input to the nodes of the input layer (L=1) as shown in FIG. 3 (in this case, the number of nodes becomes 3). However, in this case, the relationship between the changes along with time of the input parameters $P_1$, $Q_1$, and $Q_2$ and output parameter $Y_3$ do not appear in the model of the neural network. As a result, the precision of prediction of the output parameter $Y_3$ falls.

Figure 5:
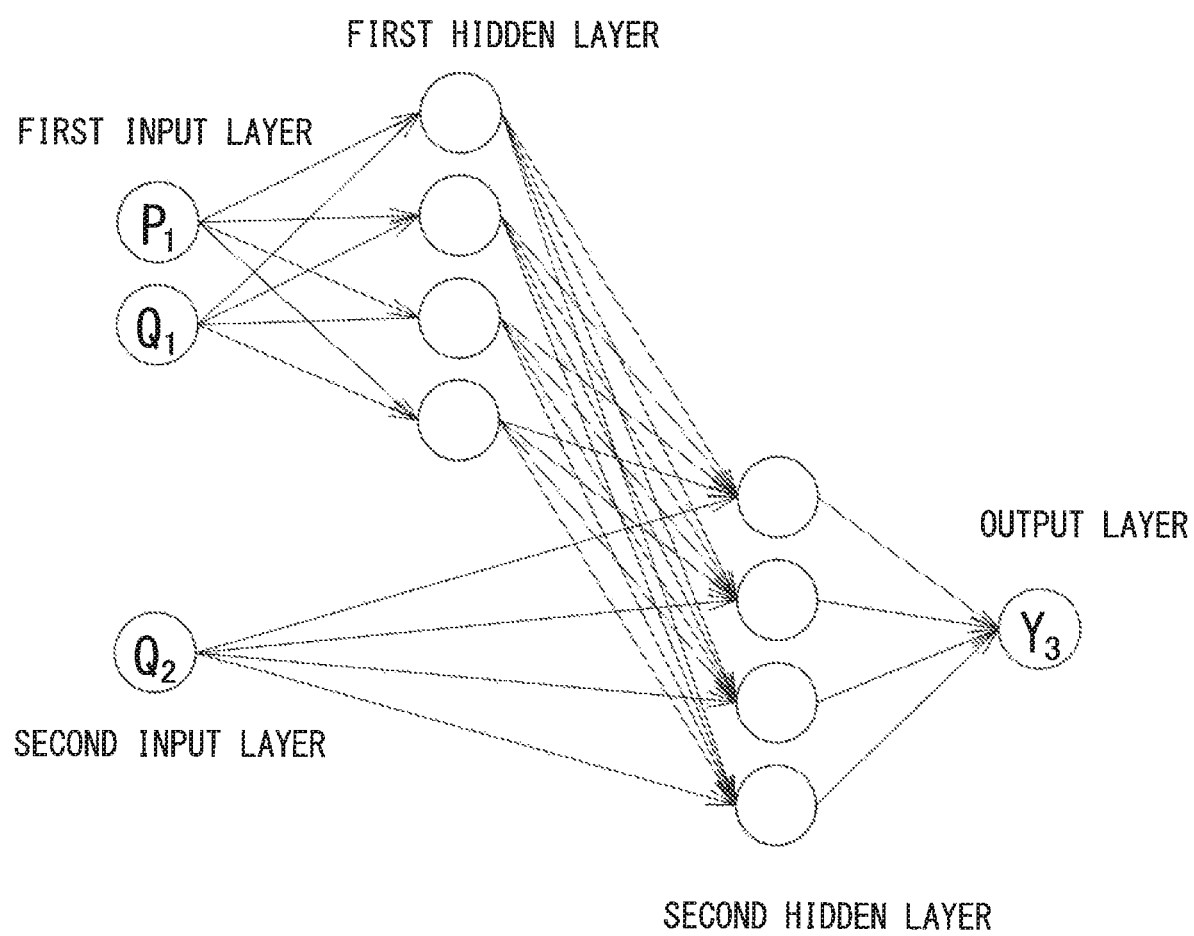
FIG. 5 is a view showing one example of a neural network used in a processing part.

Therefore, in the present embodiment, the neural network is configured so that the process by which the output parameter $Y_3$ is generated from the input parameters $P_1$, $Q_1$, and $Q_2$ is expressed. FIG. 5 is a view showing one example of a neural network used in the processing part 81.

As shown in FIG. 5, the neural network includes a first input layer to which first input parameters of the vehicle at a first point of time are input, and a second input layer to which a second input parameter of the vehicle at a second point of time after the first point of time are input. Therefore, the neural network includes a plurality of input layers. The input layers receive as input the input parameters at the same point of time, respectively.

In the example of FIG. 5, as the first input parameters of the vehicle at the first point of time, the parameters $P_1$ and $Q_1$ at the time t1 of FIG. 4 are used. For this reason, there are two first input parameters and there are two nodes of the first input layer. Further, in the example of FIG. 5, as the second input parameter of the vehicle at the second point of time, the parameter $Q_2$ at the time t2 of FIG. 4 is used. For this reason, there is one second input parameter and there is one node of the second input layer. The number of nodes of the input layers is equal to the number of input parameters input to the input layers.

In the example of FIG. 5, the parameter $P_2$ at the time t2 cannot be monitored, so the number of the second input parameters is smaller than the number of the first input parameters. Further, in the example of FIG. 5, as the first input parameters and second input parameter, common parameters (parameters Q) are used. The second input parameter is a part of the first input parameters.

Further, the neural network includes a first hidden layer and second hidden layer. That is, the neural network includes a plurality of hidden layers. In the example of FIG. 5, there are respectively four nodes of the first hidden layers and second hidden layers. That is, the numbers of the nodes of the first hidden layer and second hidden layer are equal. Further, in the example of FIG. 5, the number of the input layers and hidden layers are equal.

The first input layer is connected with the first hidden layer. Specifically, the nodes of the first input layer are respectively connected with all of the nodes of the first hidden layer. For this reason, the first hidden layer receives an input the outputs of the first input layer. Specifically, the nodes of the first hidden layer respectively receive as inputs the outputs of all of the nodes of the first input layer.

The second input layer is connected with the second hidden layer. Specifically, the nodes of the second input layer are connected with all of the nodes of the second hidden layer. For this reason, the second hidden layer receives an input the outputs of the second input layer. Specifically, the nodes of the second hidden layer respectively receive as input the outputs of all of the nodes of the second input layer.

Further, the second hidden layer receives as input the values correlated with the outputs of the first hidden layer. The values correlated with the outputs of the first hidden layer include the outputs of the first hidden layer and the outputs of the first hidden layer converted by the other at least one hidden layer if the neural network includes at least other hidden layer between the first hidden layer and the second hidden layer. In the example of FIG. 5, the first hidden layer is connected with the second hidden layer. Specifically, the nodes of the first hidden layer are respectively connected with all of the nodes of the second hidden layer. For this reason, the second hidden layer receives as input the outputs of the first hidden layer. Specifically, the nodes of the second hidden layer respectively receive as input the outputs of all of the nodes of the first hidden layer.

Further, the neural network includes an output layer outputting output parameters of the vehicle. The output layer outputs output parameters at a third point of time after the second point of time based on the outputs of the first hidden layer and the outputs of the second hidden layer. In this way, in the neural network in the present embodiment, output parameters at a relatively later point of time are output based on the input parameters at relatively earlier points of time. In the example of FIG. 5, as an output parameter of the vehicle at the third point of time, the parameter $Y_3$ at the time t3 of FIG. 4 is used. In this case, there is a single node in the output layer. The number of nodes of the output layer is equal to the number of output parameters output from the output layer.

The output layer receives as input the values correlated with the outputs of the second hidden layer. The values correlated with the outputs of the second hidden layer include the outputs of the second hidden layer and the outputs of the second hidden layer converted by at least one other hidden layer if at least one other hidden layer is included between the second hidden layer and the output layer. In the example of FIG. 5, the second hidden layer is connected to the output layer. Specifically, the nodes of the second hidden layer respectively are connected to all of the nodes of the output layer. For this reason, the output layer receives as input the outputs of the second hidden layer. Specifically, the nodes of the output layer respectively receive as input the outputs of all of the nodes of the second hidden layer.

Further, as shown in FIG. 5, the neural network is configured so that the first hidden layer to which the first input layer is connected becomes further from the output layer than the second hidden layer to which the second input layer is connected. In other words, the neural network is configured so that the first hidden layer to which the first input layer is connected becomes a layer shallower than the second hidden layer to which the second input layer is connected. Therefore, in the present embodiment, the neural network is configured so that a hidden layer to which input parameters at a relatively early point of time are input becomes further from the output layer outputting output parameters at a point of time after all input parameters than a hidden layer to which input parameters at a relatively later point of time are input. Due to the above such configuration, it is possible to precisely predict events occurring in a sequence of time using the neural network.

Further, in the example of FIG. 5, by inputting the first input parameters $P_1$ and $Q_1$ to the first hidden layer, the outputs of the first hidden layer will include a feature of an non-monitorable parameter $P_2$. As a result, the processing by the second hidden layer to which values correlated with the outputs of the first hidden layer and the second input parameter $Q_2$ are input becomes close to the processing outputting output parameters from the input parameters $P_2$ and $Q_2$. For this reason, even if there are input parameters which cannot be monitored due to the change in time, it is possible to keep the precision of prediction of the output parameters from falling.

Figure 6:
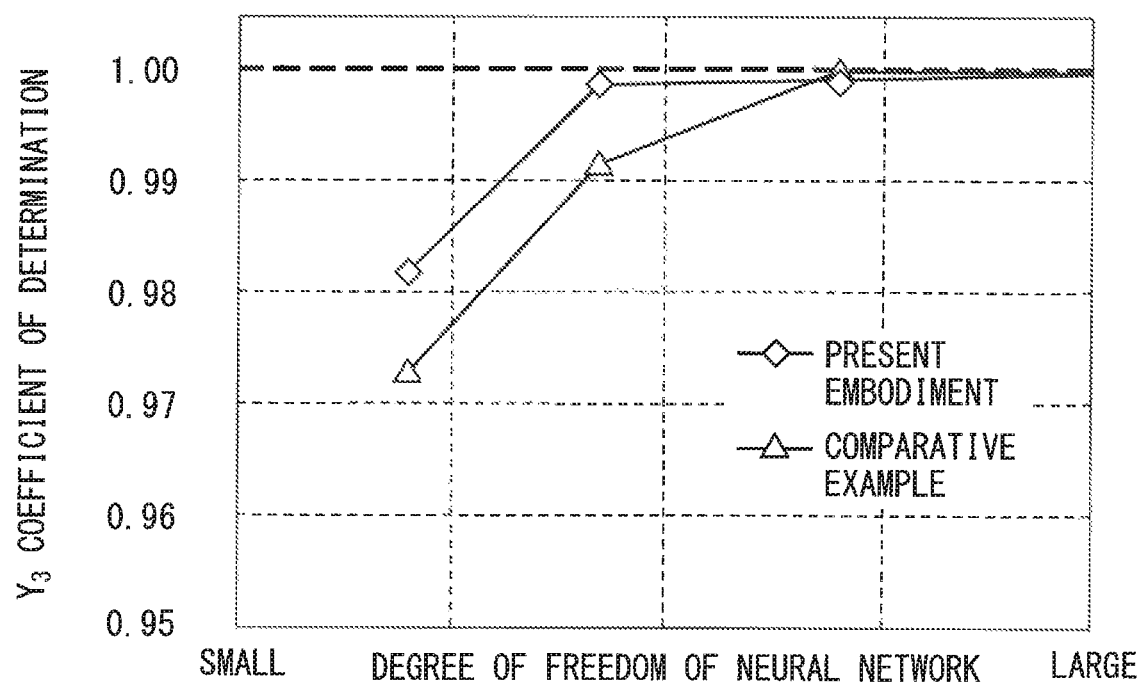
FIG. 6 is a view showing a relationship between a degree of freedom of a neural network and a coefficient of determination of an output parameter.

FIG. 6 is a view showing the relationship between the degree of freedom of the neural network and the coefficient of determination of the output parameter $Y_3$. The degree of freedom of the neural network becomes greater the greater the number of weights and biases which can be set. That is, the degree of freedom of the neural network becomes larger the larger the number of input layers, the number of nodes of the input layers, the number of hidden layers, and the number of nodes of the hidden layers.

Further, the coefficient of determination $R^2$ of the output parameter $Y_3$ is calculated by the following equation and takes a value of 0 to 1. The precision of prediction of the output parameter becomes higher the closer the coefficient of determination $R^2$ of the output parameter $Y_3$ to 1.

$R^2$=(sum of squared deviation of predicted value of output parameter $Y_3$)/(sum of squared deviation of monitored value of output parameter $Y_3$)

Here, the predicted value of the output parameter $Y_3$ is a value output by the trained neural network. The monitored value of the output parameter $Y_3$ is a value actually detected using the sensor etc.

In FIG. 6, the results using the neural network shown in FIG. 5 are plotted by diamond marks, while the results using the neural network of the comparative example are plotted by triangle marks. In the neural network of the comparative example, the second input layer is omitted from the neural network shown in FIG. 5, and as the first input parameters, the parameters $P_1$, $Q_1$, and $Q_2$ were input to the first input layer.

As will be understood from FIG. 6, in the neural network shown in FIG. 5, compared with the comparative example, even if the degree of freedom of the neural network is small, the coefficient of determination of the output parameter $Y_3$ becomes larger and the precision of prediction of the output parameter $Y_3$ becomes higher. Therefore, it is possible to raise the precision of prediction of the output parameter $Y_3$ without increasing the degree of freedom of the neural network. As a result, it is possible to reduce the learning time for preparing a trained model using the neural network.

Note that, in the neural network shown in FIG. 5, the numbers of input layers and hidden layers may respectively be equal to or larger than three. Further, the numbers of nodes of each input layer, each hidden layer, and the output layer may respectively be one or more other numbers. Further, the numbers of nodes of each hidden layer may be different. Further, if there are no parameters which cannot be monitored, the number of nodes of the first input layer and the number of nodes of the second input layer may be equal and the second input parameters may be the same as the first input parameters. Further, the second input parameters may not be contained in the first input parameters. Further, the number of the second input parameters may be greater than the number of the first input parameters.

Figure 7:
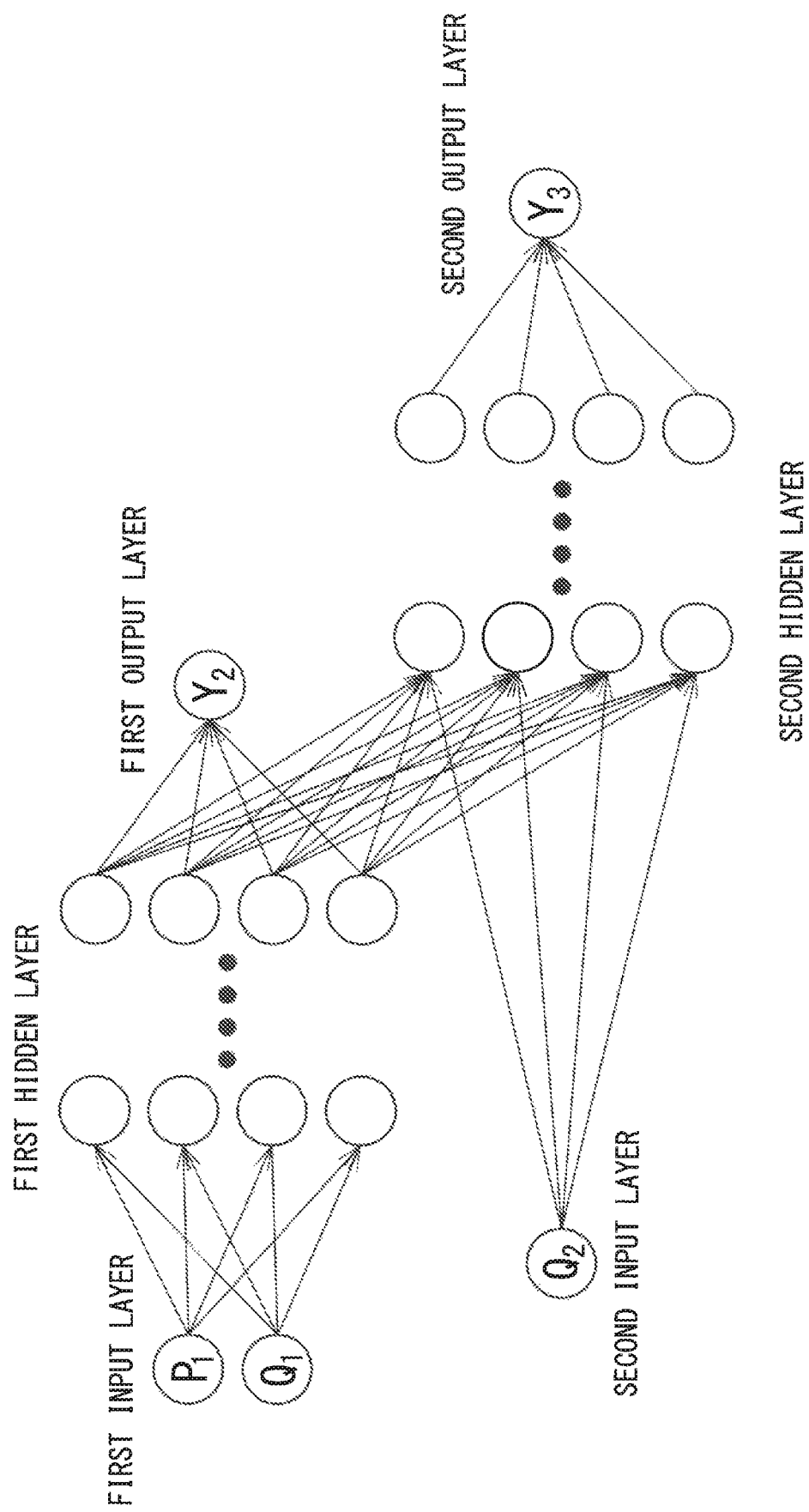
FIG. 7 is a view showing another example of a neural network used in a processing part.

FIG. 7 is a view showing another example of the neural network used in the processing part 81. As shown in FIG. 7, the neural network may include at least one hidden layer between the hidden layers connected to the input layer (first hidden layer and second hidden layer). Further, as shown in FIG. 7, the neural network may include at least one hidden layer between the second hidden layer and the output layer (second output layer). Due to this, even if the situation which the neural network handles is complicated (for example, if the number of the input parameters or output parameters is large), it is possible to increase the precision of prediction of the output parameters.

Further, the number of output layers may be equal to or more than two. For example, as shown in FIG. 7, the neural network may further contain an output layer (first output layer) connected with the first hidden layer. In the example of FIG. 7, the first output layer outputs an output parameter $Y_2$ at the second point of time.

<Specific Example of Application of Neural Network>

Figure 8:
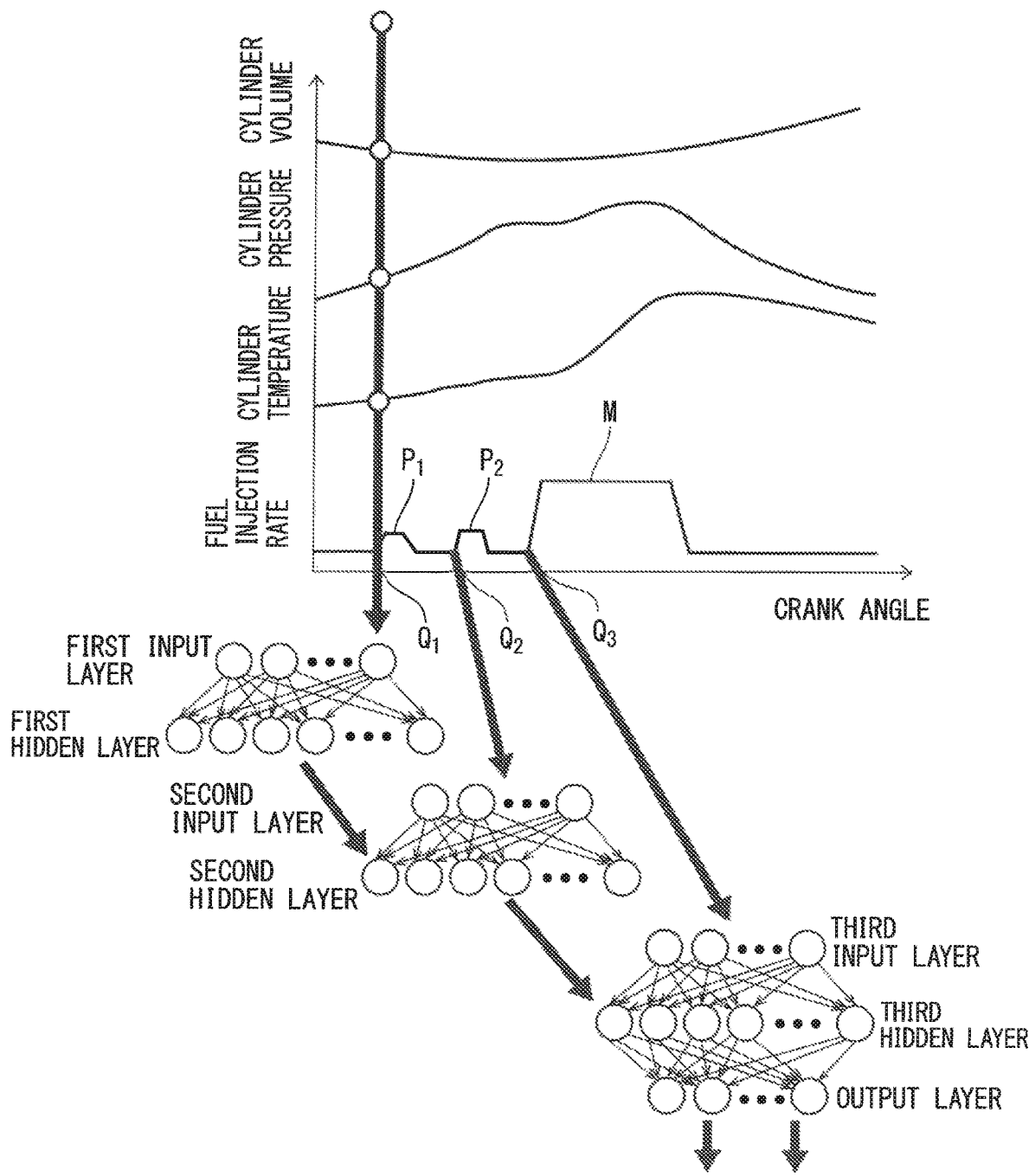
FIG. 8 is a view showing an example of application of the neural network used in the processing part.

Next, referring to FIG. 8, a specific example of application of the neural network used in the processing part 81 will be explained. FIG. 8 is a view showing an example of application of the neural network used in the processing part 81.

The neural network shown in FIG. 8 includes a first input layer to which first input parameters of the vehicle at a first point of time are input, a second input layer to which second input parameters of the vehicle at a second point of time after the first point of time are input, and a third input layer to which the third input parameters of the vehicle at a third point of time after the second point of time are input. Each of the input layers have pluralities of nodes equal to the numbers of input parameters which are input.

Further, the neural network shown in FIG. 8 includes a first hidden layer connected with the first input layer, a second hidden layer connected with the second input layer, and a third hidden layer connected with the third input layer. The first hidden layer receives as input the outputs of the first input layer. The second hidden layer receives as input the outputs of the second input layer and the outputs of the first hidden layer. The third hidden layer receives as input the outputs of the third input layer and the outputs of the second hidden layers. Each of the hidden layers have pluralities of nodes.

Further, the neural network shown in FIG. 8 includes an output layer outputting output parameters of the vehicle. The output layer outputs output parameters at the fourth point of time after the third point of time based on the outputs of the first hidden layers, the outputs of the second hidden layers, and the outputs of the third hidden layers. The output layer is connected with the third hidden layer, and the outputs of the third hidden layer are input to the output layer. Further, the output layer has a plurality of nodes.

Note that, this neural network may include at least one other hidden layer between the first hidden layer and the second hidden layer, between the second hidden layer and the third hidden layer, or between the third hidden layer and the output layer. Further, the number of the output layer may be equal to or more than two.

The model using the neural network shown in FIG. 8 is applied to the process of combustion in one cycle of the internal combustion engine 1. FIG. 8 shows a graph showing the trends in the cylinder volume, cylinder pressure, cylinder temperature, and fuel injection rate with respect to the crank angle. In the internal combustion engine 1, the fuel injectors 21 inject fuel in multiple stages. Specifically, in one cycle, two pilot injections (first pilot injection P1 and second pilot injection P2) and one main injection M are performed. The cylinder volume changes in accordance with the crank angle regardless of the state of combustion in the cylinders. On the other hand, the cylinder pressure and cylinder temperature change in accordance with the state of combustion in the cylinders.

The neural network shown in FIG. 8 outputs the sound pressure of the combustion noise generated as a result of combustion in one cycle, the concentration of harmful substances discharged from the engine body 10, and the heat efficiency of the internal combustion engine 1 as output parameters from the output layer. The harmful substances are, for example, carbon monoxide (CO), hydrocarbons (HC), nitrogen oxides (NOx), particulate matter (PM), etc. Note that, the output parameter may be at least one of the above parameters.

As parameters correlated with the output parameters, the engine speed, engine water temperature, concentration of oxygen in the intake inside the intake manifold, cylinder intake amount, cylinder volume, cylinder pressure, cylinder temperature, fuel injection amount, fuel injection timing, and fuel injection pressure may be mentioned. In particular, the above output parameters are affected by the cylinder pressure, cylinder temperature, fuel injection amount, fuel injection timing, and fuel injection pressure at the time of combustion. For this reason, the cylinder pressure, cylinder temperature, fuel injection amount, fuel injection timing, and fuel injection pressure are preferably used as first input parameters, second input parameters, and third input parameters.

However, so long as an expensive cylinder pressure sensor and cylinder temperature sensor are not provided inside the cylinders 11, the cylinder pressure and cylinder temperature after combustion cannot be detected. For this reason, the cylinder pressure and the cylinder temperature cannot be used as second input parameters and third input parameters. Therefore, in the neural network shown in FIG. 8, the input parameters are set as follows.

As the first input parameters at the first point of time, the engine speed, engine water temperature, concentration of oxygen in the intake inside the intake manifold 31, cylinder intake amount, cylinder volume, cylinder pressure, cylinder temperature, fuel injection amount, fuel injection timing, and fuel injection pressure at the crank angle $\theta 1$ are used. Therefore, the number of the first input parameters are 10. The crank angle $\theta 1$ corresponds to the start timing of the first pilot injection (P1), that is, the start timing of the fuel injection in one cycle. Note that, the first input parameter may be at least one of the above parameters.

As the second input parameters at the second point of time, the fuel injection amount, fuel injection timing, and fuel injection pressure at the crank angle $\theta 2$ are used. Therefore, the number of the second input parameters is three and is less than the number of the first input parameters. Further, the second input parameters are a part of the first input parameters. The crank angle $\theta 2$ corresponds to the start timing of the second pilot injection (P2). Note that, the single second input parameter may be at least one of the above parameters.

As the third input parameters at the third point of time, the fuel injection amount, fuel injection timing, and fuel injection pressure at the crank angle $\theta 3$ are used. Therefore, the number of the third input parameters is three and is less than the number of the first input parameters. Further, the third input parameters are equal to the second input parameters and are a part of the first input parameters. The crank angle $\theta 3$ corresponds to the start timing of the main injection (M). Note that, the third input parameter may be at least one of the above parameters.

The input parameters are calculated for example as follows using various sensors etc., at the ECU 61 and are acquired by the processing part 81. The engine speed is calculated based on the output of the crank angle sensor 79. The engine water temperature is calculated based on the output of the water temperature sensor 72. The concentration of oxygen in the intake inside the intake manifold is calculated based on the output of the oxygen concentration sensor 73. The cylinder intake amount is calculated based on the output of the air flow meter 71 and the command values output from the ECU 61 to the EGR control valve 52. The cylinder volume is calculated based on the crank angle detected by the crank angle sensor 79.

The cylinder pressure before combustion is calculated based on the output of the air flow meter 71 and the compression ratio of the internal combustion engine 1. The cylinder temperature before combustion is calculated based on the output of the intake temperature sensor 80 and the compression ratio of the internal combustion engine 1. Note that, the compression ratio of the internal combustion engine 1 is determined in advance and is stored in the memory 63 of the ECU 61. The fuel injection amount and combustion injection timing are calculated based on the command values output from the ECU 61 to the fuel injectors 21. The fuel injection pressure is calculated based on the output of the fuel pressure sensor 74.

The learning operation of the neural network shown in FIG. 8 (that is, setting of weights "w" and biases "b") is performed before the model using the neural network is mounted in the vehicle. In the learning operation of the neural network, sets of training data including the actually measured values of the input parameters and the output parameters corresponding to the input parameters (true data) are used. Specifically, by using a large number of sets of training data to repeatedly update the weights "w" and biases "b" of the neural network by the above-mentioned error backpropagation algorithm, the weights "w" and biases "b" are set. As a result, the neural network is trained and a trained model using the neural network is generated.

The generated trained model is implemented in the ECU 61 of the vehicle. Note that, the actually measured values of the input parameters and output parameters for the sets of training data, for example, are acquired in advance using an engine bench etc. Further, the learning operation of the neural network is, for example, performed using a computer installed in a factory (for example, a computer mounting a GPU).

<Flow Chart>

Figure 9:
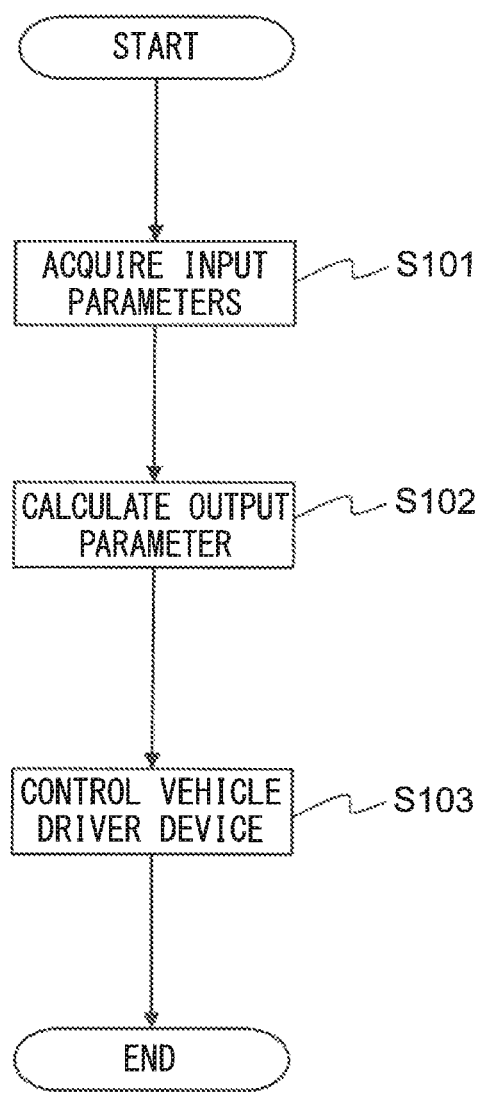
FIG. 9 is a flow chart showing a control routine of control of the vehicle drive device in the first embodiment.

FIG. 9 is a flow chart showing a control routine of control of the vehicle drive device in the first embodiment. The present control routine is repeatedly performed by the ECU 61 at predetermined intervals. The predetermined interval is for example the time of a single cycle.

First, at step S101, the processing part 81 acquires input parameters of the vehicle.

Next, at step S102, the processing part 81 uses a trained model using the neural network to calculate the output parameters of the vehicle based on the input parameters of the vehicle. Specifically, the processing part 81 inputs the input parameters acquired at step 101 into the neural network to make the neural network output the output parameters. For example, if the neural network shown in FIG. 8 is used, the first input parameters of the vehicle at the first point of time are input to the first input layer, the second input parameters of the vehicle at the second point of time are input to the second input layer, and the third input parameters of the vehicle at the third point of time are input to the third input layer. That is, the output parameters are calculated based on the first input parameters, the second input parameters and the third input parameters.

Next, at step S103, the control part 82 controls the vehicle drive device (in the present embodiment, the internal combustion engine 1) based on the output parameters calculated by the processing part 81. For example, if the output parameter is the sound pressure of the combustion noise, the control part 82 controls the pattern of fuel injection rates so that the sound pressure of the combustion noise becomes equal to or less than the target value. Further, if the output parameter is the concentration of NOx discharged from the engine body 10, the control part 82 controls the opening degree of the EGR control valve 52 etc., so that the concentration of NOx becomes equal to or less than the target value. Further, if the output parameter is the heat efficiency of the internal combustion engine 1, the control part 82 controls the patterns of fuel injection rates, timings of closing the intake values, etc., so that the heat efficiency becomes equal to or more than a predetermined value. Note that, the closing timings of the intake valves are changed by controlling a known variable valve timing mechanism provided at the internal combustion engine 1. After step S103, the present control routine is ended.

Second Embodiment

The configuration and control of the electronic control unit used in the machine learning system according to the second embodiment basically are similar to the electronic control unit in the first embodiment. For this reason, below, the second embodiment of the present invention will be explained focusing on the parts different from the first embodiment.

In the second embodiment, a trained model using the neural network is generated in the server at the outside of the vehicle. The trained model received from the server to the vehicle is used at the processing part 81. Due to this, it is possible to replace or add the trained model in accordance with need and possible to use the neural network to obtain the desired output parameters. Further, by using communication with the server to update the weights etc., of the neural network, it is possible to raise the precision of prediction of the output parameters.

Figure 10:
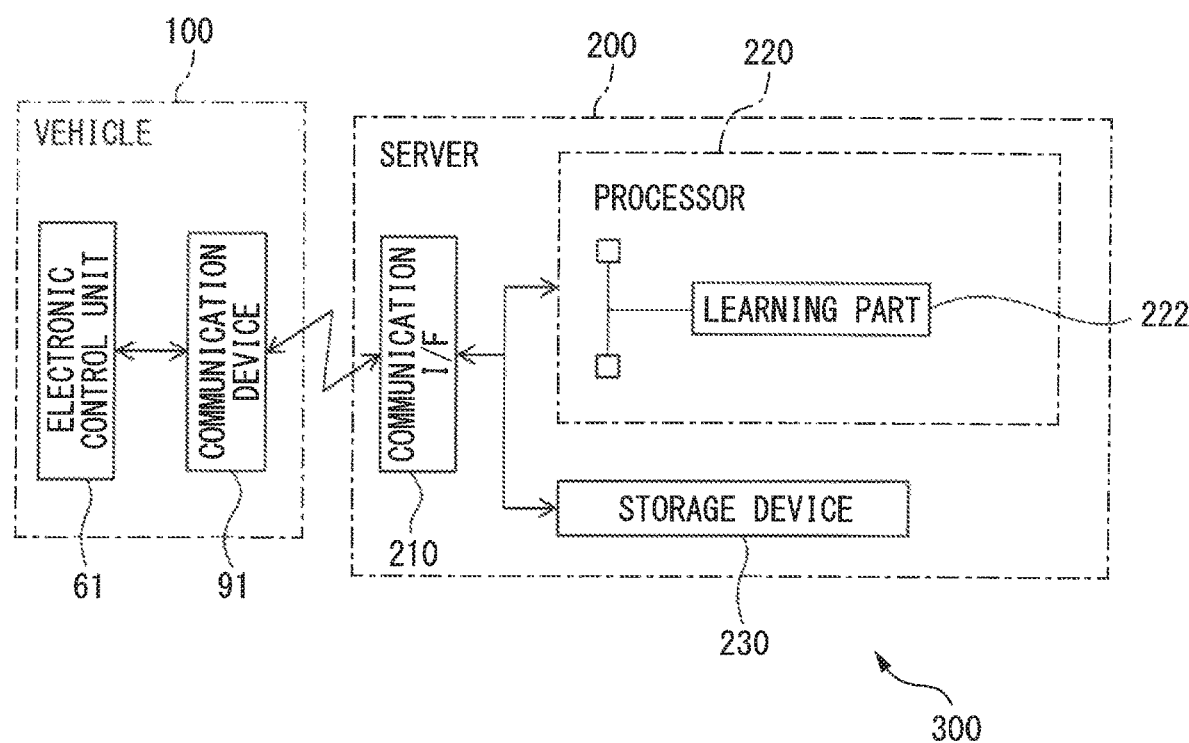
FIG. 10 is a view schematically showing a machine learning system according to a second embodiment.

FIG. 10 is a view schematically showing a machine learning system according to the second embodiment. The machine learning system 300 is provided with an electronic control unit (ECU) 61 and communication device 91 provided at the vehicle 100 and a server 200 outside of the vehicle 100. In the same way as the first embodiment, as shown in FIG. 2, the processor 65 of the ECU 61 has a processing part 81 and control part 82.

The ECU 61 and the communication device 91 can be connected to communicate with each other through an in-vehicle network based on the standards of the CAN (Controller Area Network) etc. The communication device 91 is a device able to communicate through a communication network with the server 200 and, for example, is a data communication module (DCM), The communication device 91 and the server 200 communicate by wireless communication based on various communication standards.

The server 200 is provided with a communication interface 210, storage device 230, and processor 220. The communication interface 210 and storage device 230 are connected through a signal line to a processor 220. Note that, the server 200 may be further provided with a keyboard and mouse or other such input device, a display or other such output device, etc.

The communication interface 210 has an interface circuit for connecting the server 200 through a communication network with the communication device 91 of the vehicle 100. The storage device 230, for example, is comprised of a hard disk drive (HDD), solid state drive (SDI)), optical storage medium, random access memory (RAM), or other such semiconductor memory etc.

The storage device 230 stores various types of data. Specifically, the storage device 230 stores sets of training data for learning operations of the neural network (for example, sets of training data including the first input parameters, second input parameters, and output parameters) and a computer program for learning operations of the neural network. The actually measured values of the input parameters and output parameters for sets of training data are for example acquired in advance using an engine bench etc. Note that, the actually measured values of the input parameters and output parameters for sets of training data may be acquired at other vehicles different from the vehicle 100 and sent from communication devices provided at the other vehicles to the server 200.

As shown in FIG. 10, the processor 220 of the server 200 is provided with a learning part 222 as a functional block. The learning part 222 uses the sets of training data stored in the storage device 230 of the server 200 to train the neural network and generate a trained model using the neural network. Specifically, by using a large number of sets of training data to repeatedly update the weights "w" and biases "b" of the neural network by the above-mentioned error backpropagation algorithm, the weights "w" and biases "b" are set. As a result, the neural network is trained and a trained model using the neural network is generated. Note that, the neural network in the second embodiment has a configuration similar to the first embodiment (for example, see FIG. 5, FIG. 7, and FIG. 8).

If the learning part 222 generates a trained model, the generated trained model is sent through the communication interface 210 of the server 200 and the communication device 91 of the vehicle 100 from the server 200 to the ECU 61. The processing part 81 of the ECU 61 receives the trained model from the server 200 through the communication device 91 and uses the received trained model to calculate the output parameters of the vehicle. Further, if the control part 82 of the ECU 61 controls the vehicle drive device, the control routine of FIG. 9 is performed in the same way as the first embodiment.

Third Embodiment

The configuration and control of the machine learning system according to the third embodiment basically are similar to the machine learning system in the second embodiment. For this reason, below, the third embodiment of the present invention will be explained focusing on the parts different from the second embodiment.

In the third embodiment, in the same way as the second embodiment, a trained model using the neural network is generated at a server outside of the vehicle. The trained model received from the server to the vehicle is used in the processing part 81. On the other hand, in the third embodiment, the actually measured values of the input parameters and output parameters for the sets of training data are acquired at the vehicle. By doing this, a large number of sets of training data can be easily prepared.

Figure 11:
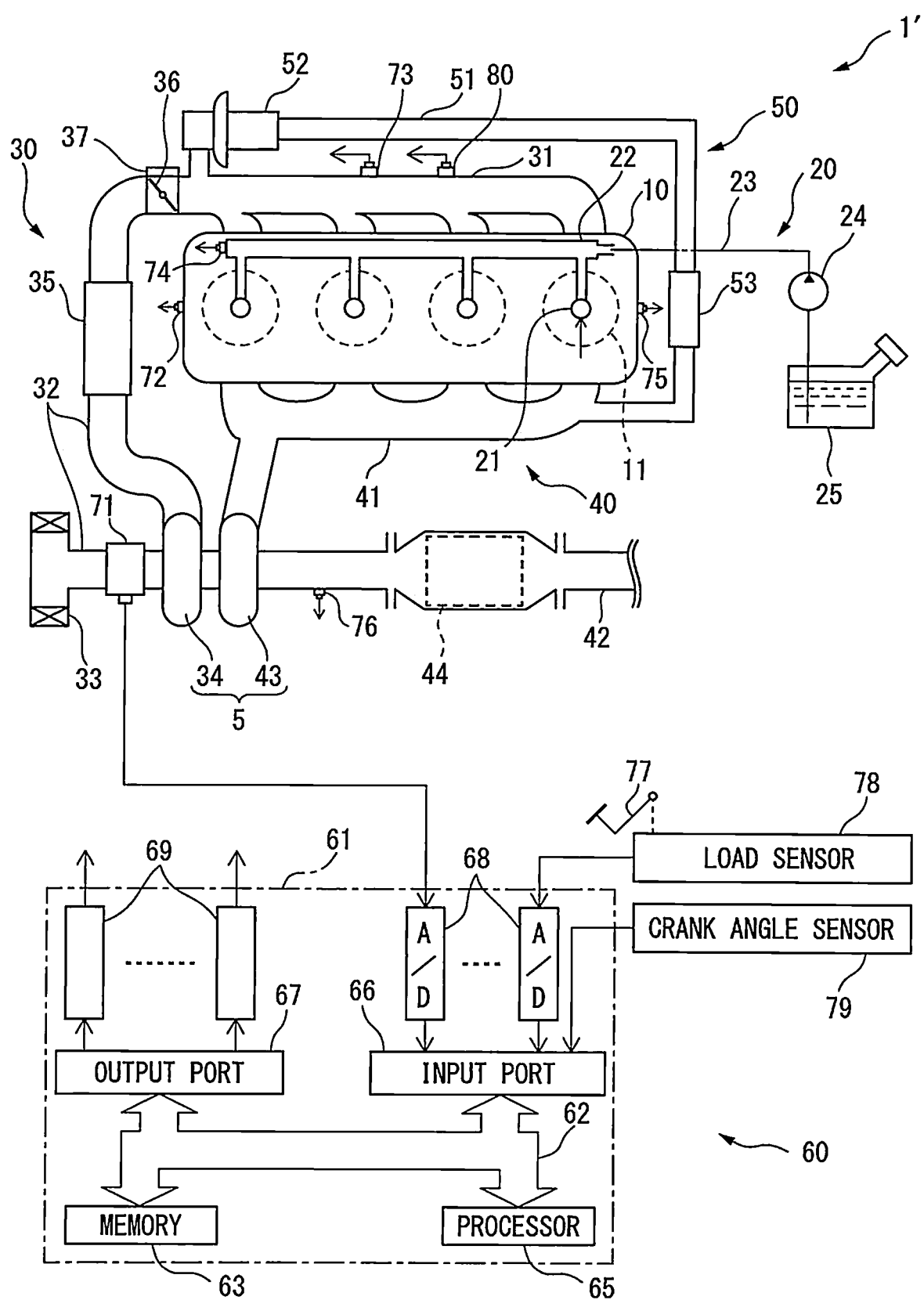
FIG. 11 is a view schematically showing an internal combustion engine provided at a vehicle to which a machine learning system according to a third embodiment is applied.

FIG. 11 is a view schematically showing an internal combustion engine provided at a vehicle to which the machine learning system according to the third embodiment is applied. The internal combustion engine 1' is provided with a sound pressure sensor 75 and concentration sensor 76 in addition to the various sensors shown in FIG. 1.

The sound pressure sensor 75 for example is arranged at the cylinder block of the engine body 10 and detects the sound pressure of the combustion noise. The concentration sensor 76 is arranged in the exhaust passage of the internal combustion engine 1', for example, between the turbine 43 and the DPF 44, and detects the concentration of harmful substances discharged from the engine body 10. The concentration sensor 76 is, for example, an HC concentration sensor for detecting the concentration of HC, an NOx concentration sensor for detecting the concentration of $NO_X$, etc. The outputs of the sound pressure sensor 75 and concentration sensor 76 are input through the corresponding AD) converters 68 to the input port 66 of the ECU 61.

Figure 12:
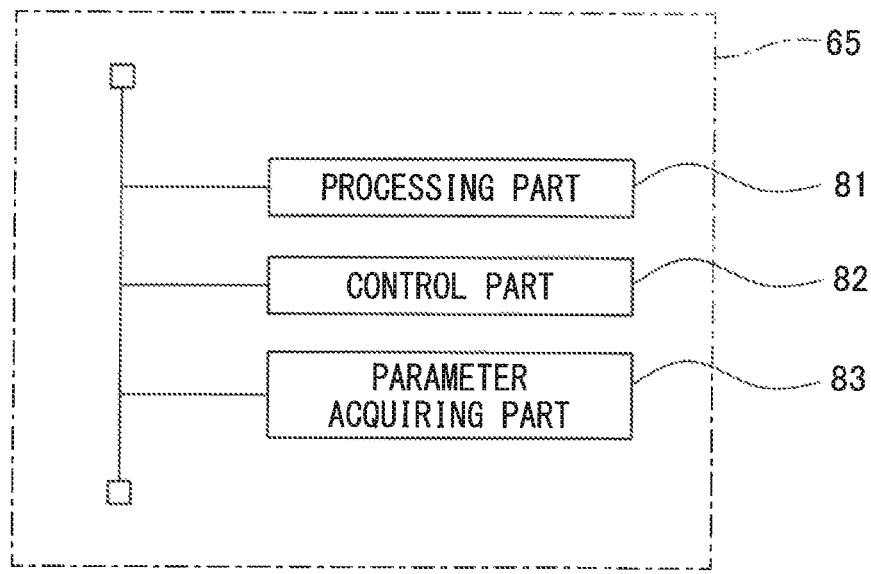
FIG. 12 is a functional block diagram of a processor of an ECU in the third embodiment.

In the same way as the second embodiment, as shown in FIG. 10, the machine learning system 300 comprises an electronic control unit (ECU) 61 and communication device 91 provided at the vehicle 100 and a server 200 at the outside of the vehicle 100. FIG. 12 is a functional block diagram of a processor 65 of the ECU 61 in the third embodiment. In the third embodiment, the processor 65 has a parameter acquiring part 83 in addition to the processing part 81 and control part 82.

The parameter acquiring part 83 acquires the input parameters and output parameters of the vehicle 100. Specifically, the parameter acquiring part 83 acquires the input parameters calculated by the ECU 61 based on the outputs of the various sensors etc., in the same way as the processing part 81. Further, the parameter acquiring part 83 acquires output parameters calculated by the ECU 61 based on the outputs of the various sensors etc. For example, if the output parameter is the sound pressure of the combustion noise, the parameter acquiring part 83 acquires the sound pressure of the combustion noise calculated based on the output of the sound pressure sensor 75. Further, when the output parameter is the concentration of harmful substances discharged from the engine body 10, the parameter acquiring part 83 acquires the concentration of harmful substances calculated based on the output of the concentration sensor 76.

If the neural network trained by the learning part 222 of the server 200 has the configuration such as shown in FIG. 5 or FIG. 7, the parameter acquiring part 83 acquires the first input parameters of the vehicle at the first point of time, the second input parameters of the vehicle at the second point of time, and the output parameters of the vehicle at the third point of time. Further, if the trained neural network has the configuration such as shown in FIG. 8, the parameter acquiring part 83 acquires the first input parameters of the vehicle at the first point of time, the second input parameters of the vehicle at the second point of time, the third input parameters of the vehicle at the third point of time, and the output parameters of the vehicle at the fourth point of time.

The parameter acquiring part 83 sends the acquired input parameters and output parameters through the communication device 91 to the server 200. The input parameters and output parameters sent to the server 200 are stored in the storage device 230 of the server 200.

The learning part 222 of the server 200 uses the input parameters and output parameters acquired by the parameter acquiring part 83 as sets of training data to generate a trained model using the neural network. Specifically, by using a large number of sets of training data and repeatedly updating the weight "w" and bias "b" of the neural network by the above-mentioned error backpropagation algorithm, the weight "w" and bias "b" are set. As a result, the neural network is trained and a trained model using the neural network is generated.

Further, in the same way as the second embodiment, the learning part 222 of the server 200 sends the trained model to the processing part 81, and the processing part 81 uses the received trained model to calculate the output parameters. By using the trained model to calculate the output parameters, it is possible to predict the output parameters for predetermined input parameters before detecting the output parameters by sensors etc.

Further, if the control part 82 of the ECU 61 is used to control the vehicle drive device, the control routine of FIG. 9 is performed in the same way as the first embodiment.

Fourth Embodiment

The configuration and control of the control device of a vehicle drive device according to the fourth embodiment basically are similar to the control device of the vehicle drive device in the first embodiment. For this reason, below, the fourth embodiment of the present invention will be explained focusing on the parts different from the first embodiment.

In the fourth embodiment, in the same way as the third embodiment, the actually measured values of the input parameters and output parameters for sets of training data are acquired at the vehicle. On the other hand, in the fourth embodiment, a trained model using the neural network is generated at the vehicle. By doing this, it is possible to use the vehicle to easily generate the trained model.

Figure 13:
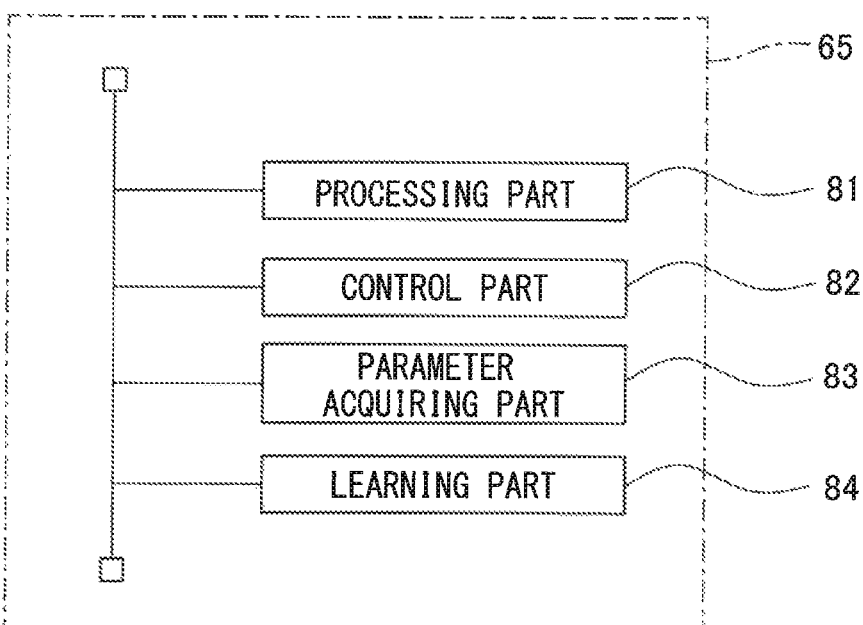
FIG. 13 is a functional block diagram of a processor of an ECU in a fourth embodiment.

FIG. 13 is a functional block diagram of the processor 65 of an ECU 61 in the fourth embodiment. In the fourth embodiment, the processor 65 has a parameter acquiring part 83 and learning part 84 in addition to the processing part 81 and control part 82. The parameter acquiring part 83 acquires the input parameters and output parameters in the same way as the third embodiment. The acquired input parameters and output parameters are stored in the memory 63 of the ECU 61.

The learning part 84 uses the input parameters and output parameters acquired by the parameter acquiring part 83 as sets of training data to generate a trained model using the neural network. Specifically, by using a large number of sets of training data and repeatedly updating the weights "w" and biases "b" of the neural network by the above-mentioned error backpropagation algorithm, the weights "w" and biases "b" are set. As a result, the neural network is trained and a trained model using the neural network is generated.

The processing part 81 uses the trained model generated by the learning part 84 to calculate the output parameters. By using the trained model to calculate the output parameters, it is possible to predict the output parameters for predetermined input parameters before detecting the output parameters by sensors etc.

Further, if the control part 82 of the ECU 61 controls a vehicle drive device, the control routine of FIG. 9 is performed in the same way as the first embodiment.

Other Embodiments

Above, preferred embodiments according to the present invention were explained, but the present invention is not limited to these embodiments and can be corrected and changed in various ways within the language of the claims.

For example, the vehicle drive device may be a gasoline engine. For example, the model obtained using the neural network in the present embodiment may be applied to a gasoline engine provided with port injectors injecting fuel into intake ports and cylinder injectors directly injecting fuel into cylinders. In this case, in one cycle, first, fuel is injected from the port injectors, then fuel is injected from the cylinder injectors. If considering this, the first input parameters, second input parameters, and output parameters at the neural network are for example set as follows:

The first input parameters include at least one of an engine speed, port injection amount, port injection timing, intake temperature, intake pressure, opening degree of EGR control valve, and amount of intake air. Further, the second input parameters include at least one of a cylinder injection amount, cylinder injection timing, and cylinder injection pressure. Further, the output parameters include at least one of the ignition timing of the air-fuel mixture, the combustion period of the air-fuel mixture, the concentration of harmful substances discharged from the engine body, and the maximum value of the amount of generation of heat by combustion. In this case as well, the first input parameters, second input parameters, and output parameters can be calculated at the ECU 61 based on the outputs of the various sensors etc.

Further, the vehicle drive device may be a drive system other than an internal combustion engine, for example, a motor, transmission, battery, etc. For example, the model using the neural network in the present embodiment may be applied to a battery carried in a hybrid vehicle (HV), plug-in hybrid vehicle (PHV), or electric vehicle (EV). The initial value of the state of charge (SOC) of the battery at the time of start of operation of the vehicle can be calculated based on the output of the voltage sensor able to detect the voltage of the battery. Further, if a temperature sensor able to detect the temperature of the battery is provided at the battery, the temperature of the battery during operation of vehicle can also be monitored. On the other hand, the SOC during operation of the vehicle cannot be monitored. Considering this, the first input parameters, second input parameters, and output parameters at the neural network are for example set as follows:

The first input parameters include at least one of a battery voltage, battery current, a battery temperature at the time of start of operation of the vehicle, an SOC of the battery at the time of start of operation of the vehicle, and a continuous operation time of the vehicle. Further, the second input parameters include the battery temperature during operation of the vehicle. Further, the output parameters include the SOC of the battery during operation of the vehicle. In this case as well, the first input parameters, second input parameters, and output parameters can be calculated based on at the ECU 61 the outputs of the various sensors etc.

Further, the trained model using the neural network explained above may be used for an output parameter calculation device configured to calculate output parameters based on first input parameters and second input parameters. In this case, the first input parameters, second input parameters, and output parameters are not limited to parameters relating to a vehicle.

REFERENCE SIGNS LIST

1, 1'. internal combustion engine
60. control device of a vehicle drive device
61. electronic control unit (ECU)
81. processing part
82. control part
83. parameter acquiring part
91. communication device
100. vehicle
200. server
300. machine learning system

The invention claimed is:

1. A control device of a vehicle drive device comprising a processing part configured to use a trained model using a neural network to calculate at least one output parameter of a vehicle, and
a control part configured to control the vehicle drive device mounted in the vehicle based on the at least one output parameter calculated by the processing part, wherein
the neural network includes a first input layer to which at least one first input parameter of the vehicle at a first point of time is input, a second input layer to which at least one second input parameter of the vehicle at a second point of time after the first point of time is input, a first hidden layer to which outputs of the first input layer are input, a second hidden layer to which at least one value correlated with the outputs of the first hidden layer, and outputs of the second input layer are input, and an output layer outputting at least one output parameter.

2. The control device of a vehicle drive device according to claim 1, wherein the number of the second input parameters is smaller than the number of the first input parameters.

3. The control device of a vehicle drive device according to claim 2, wherein the second input parameters are a part of the first input parameters.

4. The control device of a vehicle drive device according to claim 1, wherein the neural network is configured so that outputs of the first hidden layer are input to the second hidden layer.

5. The control device of a vehicle drive device according to claim 1, wherein the neural network includes at least one hidden layer between the first hidden layer and the second hidden layer.

6. The control device of a vehicle drive device according to claim 1, wherein the neural network is configured so that outputs of the second hidden layer are input to the output layer.

7. The control device of a vehicle drive device according to claim 1, wherein the neural network includes at least one hidden layer between the second hidden layer and the output layer.

8. The control device of a vehicle drive device according to claim 1, wherein
the control part is configured to control an internal combustion engine mounted in the vehicle, and
the first input parameters include at least one of engine speed, engine water temperature, concentration of oxygen in intake inside an intake manifold, cylinder intake amount, cylinder volume, cylinder pressure, cylinder temperature, fuel injection amount, fuel injection timing, and fuel injection pressure, the second input parameters include at least one of a fuel injection amount, fuel injection timing, and fuel injection pressure, and the output parameters include at least one of a sound pressure of combustion noise, a concentration of harmful substances discharged from an engine body, and a heat efficiency of the internal combustion engine.

9. The control device of a vehicle drive device according to claim 8, wherein the first input parameters include the cylinder pressure and cylinder temperature, and the second input parameters do not include the cylinder pressure and cylinder temperature.

10. A vehicle-mounted electronic control unit comprising a processing part configured to receive a trained model using a neural network through a communication device provided at a vehicle from a server at an outside of the vehicle and using the trained model to calculate at least one output parameter of the vehicle, wherein
the neural network includes a first input layer to which at least one first input parameter of the vehicle at a first point of time is input, a second input layer to which at least one second input parameter of the vehicle at a second point of time after the first point of time is input, a first hidden layer to which outputs of the first input layer are input, a second hidden layer to which at least one value correlated with the outputs of the first hidden layers, and outputs of the second input layer are input, and an output layer outputting at least one output parameter, and
the server comprises a storage device storing sets of training data including the first input parameters, the second input parameters, and the output parameters and is configured to use the sets of training data to generate the trained model.

11. A vehicle-mounted electronic control unit comprising
a parameter acquiring part configured to acquire at least one first input parameter of a vehicle at a first point of time, at least one second input parameter of the vehicle at a second point of time after the first point of time, and at least one output parameter of the vehicle at a point of time after the second point of time, and send the at least one first input parameter, the at least one second input parameter, and at least one output parameter through a communication device provided at the vehicle to a server at an outside of the vehicle, and
a processing part configured to receive a trained model using a neural network from the server through the communication device and using the trained model to calculate the at least one output parameter, wherein
the neural network includes a first input layer to which the at least one first input parameter is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting the at least one output parameter, and
the server uses the at least one first input parameter, the at least second input parameter, and the at least output parameters acquired by the parameter acquiring part as sets of training data to generate the trained model.

12. A trained model using a neural network including a first input layer to which at least one first input parameter of a vehicle at a first point of time is input, a second input layer to which at least one second input parameter of the vehicle at a second point of time after the first point of time is input, a first hidden layer to which outputs of the first input layer are input, a second hidden layer to which at least one value correlated with the outputs of the first hidden layer, and outputs of the second input layer are input, and an output layer outputting at least one output parameter of the vehicle, wherein
weights of the neural network have been trained using the at least one first input parameter, the at least one second input parameter, and the at least one output parameter as sets of training data.

13. A machine learning system comprising an electronic control unit provided at a vehicle, a communication device provided at the vehicle, and a server at an outside of the vehicle, wherein,
the electronic control unit comprises
a parameter acquiring part configured to acquire at least one first input parameter of the vehicle at a first point of time, at least one second input parameter of the vehicle at a second point of time after the first point of time, and at least one output parameter of the vehicle at a point of time after the second point of time, and send the at least one first input parameter, the at least one second input parameter, and the at least one output parameter through the communication device to the server, and
a processing part configured to receive a trained model using a neural network from the server through the communication device and use the trained model to calculate the at least one output parameter, wherein
the neural network includes a first input layer to which the at least one first input parameters is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting at least one output parameter, and
the server is configured to use the at least one first input parameter, the at least one second input parameter, and the at least one output parameter acquired by the parameter acquiring part as sets of training data to generate the trained model.

14. A method of controlling a vehicle drive device comprising
acquiring at least one first input parameter of a vehicle at a first point of time and at least one second input parameter of the vehicle at a second point of time after the first point of time,
using a trained model using a neural network to calculate at least one output parameter of the vehicle based the at least one first input parameter and the at least one the second input parameter, and
controlling a vehicle drive device mounted in the vehicle based on the at least one output parameter, wherein
the neural network include a first input layer to which the at least one first input parameter is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting the at least one output parameter.

15. A method of producing an electronic control unit comprising:
using at least one first input parameter of a vehicle at a first point of time, at least one second input parameter of the vehicle at a second point of time after the first point of time, and at least one output parameter of the vehicle at a point of time after the second point of time as sets of training data to generate a trained model using a neural network, and
implementing the trained model into the electronic control unit, wherein
the neural network includes a first input layer to which the at least one first input parameter is input, a second input layer to which the at least one second input parameter is input, a first hidden layer to which outputs of the first input layer are input, a second hidden layer to which at least one value correlated with the outputs of the first hidden layer, and outputs of the second input layer are input, and an output layer outputting the at least one output parameter.

16. An output parameter calculation device configured to use a trained model using a neural network including a first input layer to which at least one first input parameter at a first point of time is input, a second input layer to which at least one second input parameter at a second point of time after the first point of time is input, a first hidden layer to which outputs of the first input layer are input, a second hidden layer to which at least one value correlated with the outputs of the first hidden layer, and outputs of the second input layer are input, and an output layer outputting at least one output parameter so as to calculate the at least one output parameter based on the at least one first input parameter and the at least one second input parameter.

* * * * *